(12) United States Patent
Lindgren et al.

(10) Patent No.: US 7,298,922 B1
(45) Date of Patent: Nov. 20, 2007

(54) SYNTHETIC PANCHROMATIC IMAGERY METHOD AND SYSTEM

(75) Inventors: John Elmer Lindgren, San Jose, CA (US); David Nicholas Christie, Brentwood, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 687 days.

(21) Appl. No.: 10/886,999

(22) Filed: Jul. 7, 2004

(51) Int. Cl.
*G06K 9/32* (2006.01)

(52) U.S. Cl. .................. 382/294; 382/164; 382/284; 382/291; 358/518; 358/520; 342/25 A; 342/409

(58) Field of Classification Search .......... 382/164, 382/167, 284, 294; 358/1.2, 518, 520; 342/25 A, 342/409
See application file for complete search history.

(56) References Cited

U.S. PATENT DOCUMENTS

| | | | |
|---|---|---|---|
| 5,812,705 A * | 9/1998 | Wang et al. ........... 382/294 |
| 6,097,835 A | 8/2000 | Lindgren |
| 6,874,420 B2 * | 4/2005 | Lewis et al. .......... 101/485 |
| 6,990,249 B2 * | 1/2006 | Nomura ................ 382/254 |
| 7,075,427 B1 * | 7/2006 | Pace et al. ........... 340/539.22 |
| 7,133,083 B2 * | 11/2006 | Jaynes et al. .......... 348/745 |

OTHER PUBLICATIONS

William K. Pratt, "Digital Image Processing", Second Edition, Wiley-Interscience, pp. 651-673, 1991.

\* cited by examiner

*Primary Examiner*—Bhavesh M. Mehta
(74) *Attorney, Agent, or Firm*—McDermott Will & Emery LLP

(57) ABSTRACT

Method and system for generating synthetic panchromatic imagery. A method for making a multi-spectral image includes capturing a panchromatic image of an imaging target. Additionally, the method includes capturing at least a first spectral image of the imaging target in a first spectral bandwidth, and capturing at least a second spectral image of the imaging target in a second spectral bandwidth. Also, the method includes determining at least a first spectral weight and a second spectral weight for the first spectral image and the second spectral image respectively. Additionally, the method includes generating a synthetic panchromatic image, determining a registration offset between the synthetic panchromatic image and the captured panchromatic image, warping the first spectral image and the second spectral image, and generating a multi-spectral image.

25 Claims, 21 Drawing Sheets

Distorted Image

Smeared Colors

Saturated Colors

Real Panchromatic Image

Synthetic Panchromatic Image
(1/4 resolution)

MSI Imagery

Panchromatic Sharpened (unregistered sources)

smeared colors

Panchromatic Sharpened (registered sources)

MSI Imagery saturated colors

Panchromatic Sharpened
(unregistered sources)

Figure 15(C) Panchromatic Sharpened (registered sources)

SYNTHETIC PANCHROMATIC IMAGERY METHOD AND SYSTEM

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention relates generally to imaging techniques. More particularly, the invention provides a method and system for generating synthetic panchromatic images. Merely by way of example, the invention has been applied to generating high resolution pan-sharpened multi-spectral images. The method and system for generating high resolution images can be used to generate satellite imagery products. Additionally, it would be recognized that the invention has a much broader range of applicability.

Optical systems have been widely used for detecting color images of various targets. Such optical systems often employ a panchromatic detector and a multi-spectral detector. The panchromatic detector generates panchromatic gray-scale images, while the multi-spectral detector detects spectral images in various bands of wavelengths, such as red, green, blue and near infrared ("NIR") bands. The panchromatic detector typically possesses a spatial resolution higher than that of the multi-spectral detector. Using the multi-spectral detector with relatively low resolution reduces costs of optical systems and associated transmission bandwidth requirements. Further, the high resolution panchromatic images and the low spatial resolution multi-spectral images can be mathematically combined to form high resolution multi-spectral images in a process called pan-sharpening. A system acquiring and synthesizing the multi-spectral images and the panchromatic images is described below.

FIG. 1 is a simplified diagram for a conventional optical system with panchromatic detector and multi-spectral detector. Optical system 110 is an imaging system positioned in a spacecraft that generates images of targets on the earth surface. Optical system 110 includes at least multi-spectral image detector 120 and panchromatic image detector 130. Multi-spectral detector 120 generates multiple images in different bands of wavelengths. As discussed above, the bands of wavelength may include red, green, blue and NIR bands. Within optical system 110, multi-spectral detector 120 and panchromatic detector 130 are placed in different locations. For each imaging object, optical system 110 generates multiple images, such as panchromatic, red, green, blue and NIR images. The specific processes for image acquisition is described below.

FIG. 2 illustrates a simplified conventional process for optical system 110 to capture multiple images of an imaging target on the earth surface. Optical system 110 moves with respect to earth surface 210. For example, at time $t_1$, panchromatic detector 130 of optical system 110 captures a panchromatic image of imaging area 220. Subsequently, at time $t_2$, multi-spectral detector 120 of optical system 110 captures several spectral images of imaging area 220. In another example, at time $t_1$, multi-spectral detector 120 of optical system 110 captures several spectral images of imaging area 220. Subsequently, at time $t_2$, panchromatic detector 130 of optical system 110 captures a black-and-white image of imaging area 220. The interval between time $t_1$ and time $t_2$ is usually small. For example, the interval may be only 0.5 second. Nonetheless, during this short interval, imaging surface 220 may have changed. Additionally, imaging angle $\alpha_1$ at time $t_1$ and imaging angle $\alpha_2$ at time $t_2$ are usually different. The imaging angle is the angle between the imaging direction and the reference direction vertical to imaging area 220. Consequently, the panchromatic image may not match the multi-spectral images, and this mismatch creates difficulties in producing high resolution color images.

Hence it is desirable to improve technique for creating high resolution color images.

BRIEF SUMMARY OF THE INVENTION

The present invention relates generally to imaging techniques. More particularly, the invention provides a method and system for generating synthetic panchromatic images. Merely by way of example, the invention has been applied to generating high resolution pan-sharpened multi-spectral images. The method and system for generating high resolution images can be used to generate satellite imagery products. Additionally, it would be recognized that the invention has a much broader range of applicability.

According to the present invention, a number of embodiments for generating and using synthetic panchromatic images are provided. Merely by way of an example, a method for making a multi-spectral image includes capturing a panchromatic image of an imaging target. The captured panchromatic image is associated with a captured panchromatic resolution. Additionally, the method includes capturing at least a first spectral image of the imaging target in a first spectral bandwidth. The first spectral image is associated with a first spectral resolution. Moreover, the method includes capturing at least a second spectral image of the imaging target in a second spectral bandwidth. The second spectral image is associated with a second spectral resolution. Also, the method includes determining at least a first spectral weight and a second spectral weight for the first spectral image and the second spectral image respectively based on at least information associated with the captured panchromatic image, the first spectral image and the second spectral image. Additionally, the method includes generating a synthetic panchromatic image based on at least information associated with the first spectral image, the second spectral image, the first spectral weight, and the second spectral weight. The synthetic panchromatic image is associated with a synthetic panchromatic resolution. Moreover, the method includes determining a registration offset between the synthetic panchromatic image and the captured panchromatic image by matching a first pixel on the synthetic panchromatic image and a second pixel on the captured panchromatic image. The first pixel and the second pixel correspond to a same portion of the imaging target. Also, the method includes warping the first spectral image and the second spectral image based on at least information associated with the registration offset, and generating a multi-spectral image based on at least information associated with the first spectral image, the second spectral image, the first spectral weight, the second spectral weight, the captured panchromatic image, and the registration offset. The generated multi-spectral image is associated with a third resolution.

According to another embodiment of the present invention, a method for making a multi-spectral image includes capturing a panchromatic image of an imaging target. The captured panchromatic image is associated with a captured panchromatic spatial resolution. Additionally, the method includes capturing at least a first spectral image of the imaging target in a first spectral bandwidth. The first spectral image is associated with a first spectral spatial resolution, and the first spectral spatial resolution is lower than the captured panchromatic spatial resolution. Moreover, the method includes capturing at least a second spectral image of the imaging target in a second spectral bandwidth. The second spectral image is associated with a second spectral spatial resolution, and the second spectral spatial resolution is lower than the captured panchromatic spatial resolution. Also, the method includes generating a synthetic panchromatic image based on at least information associated with the first spectral image and the second spectral image. The synthetic panchromatic image is associated with a synthetic panchromatic spatial resolution. Additionally, the method includes processing at least information associated with the synthetic panchromatic image and the captured panchromatic image, and determining a registration offset between the synthetic panchromatic image and the captured panchromatic image by matching a first pixel on the synthetic panchromatic image and a second pixel on the captured panchromatic image. The first pixel and the second pixel correspond to a same portion of the imaging target. Moreover, the method includes warping the first spectral image and the second spectral image based on at least information associated with the registration offset, and generating a multi-spectral image based on at least information associate with the first spectral image, the second spectral image, the first spectral weight, the second spectral weight, the captured panchromatic image, and the registration offset. The multi-spectral image is associated with a third spatial resolution, and the third spatial resolution is substantially equal to the captured panchromatic spatial resolution.

According to yet another embodiment of the present invention, a method for making a color image includes capturing a panchromatic image of an imaging target. The captured panchromatic image is associated with a captured panchromatic resolution. Additionally, the method includes capturing at least a first spectral image of the imaging target in a first spectral bandwidth. The first spectral image is associated with a first spectral resolution. Moreover, the method includes capturing at least a second spectral image of the imaging target in a second spectral bandwidth. The second spectral image is associated with a second spectral resolution. Also, the method includes determining at least a first spectral weight and a second spectral weight for the first spectral image and the second spectral image respectively based on at least information associated with the captured panchromatic image, the first spectral image and the second spectral image, and generating a synthetic panchromatic image based on at least information associated with the first spectral image, the second spectral image, the first spectral weight, and the second spectral weight. The synthetic panchromatic image is associated with a synthetic panchromatic resolution. Additionally, the method includes determining a registration offset between the synthetic panchromatic image and the captured panchromatic image by matching a first pixel on the synthetic panchromatic image and a second pixel on the captured panchromatic image. The first pixel and the second pixel correspond to a same portion of the imaging target. Moreover, the method includes warping the first spectral image and the second spectral image based on at least information associated with the registration offset, and generating a color image based on at least information associated with the first spectral image, the second spectral image, the first spectral weight, the second spectral weight, the captured panchromatic image, and the registration offset. The generated multi-spectral image is associated with a third resolution. The color image is free from image distortion, smeared color, and saturated color.

Many benefits may be achieved by way of the present invention over conventional techniques. For example, certain embodiments of the present invention improve the quality of panchromatic sharpening processes and subsequently derived high quality multi-spectral image products. In some embodiments of the present invention, the synthetic panchromatic image can provide high correlation with the captured panchromatic image. This high correlation leads to accurate panchromatic to multi-spectral registration offset generation and thus improves effectiveness of subsequent panchromatic sharpening. Certain embodiments of the present invention allow panchromatic sensor and/or spectral imaging sensors to be designed with less strict requirements in order to maintain the same image registration accuracy. Use of synthetic panchromatic image allows effective post-processing to remove image misregistration artifacts caused by sensors. Some embodiments of the present invention can be implemented very efficiently using existing hardware and software technology.

Depending upon the embodiment under consideration, one or more of these benefits may be achieved. These benefits and various additional objects, features and advantages of the present invention can be fully appreciated with reference to the detailed description and accompanying drawings that follow.

DETAILED DESCRIPTION OF THE INVENTION

The present invention relates generally to imaging techniques. More particularly, the invention provides a method and system for generating synthetic panchromatic images. Merely by way of example, the invention has been applied to generating high resolution pan-sharpened multi-spectral images. The method and system for generating high resolution images can be used to generate satellite imagery products. Additionally, it would be recognized that the invention has a much broader range of applicability.

Figure 1:
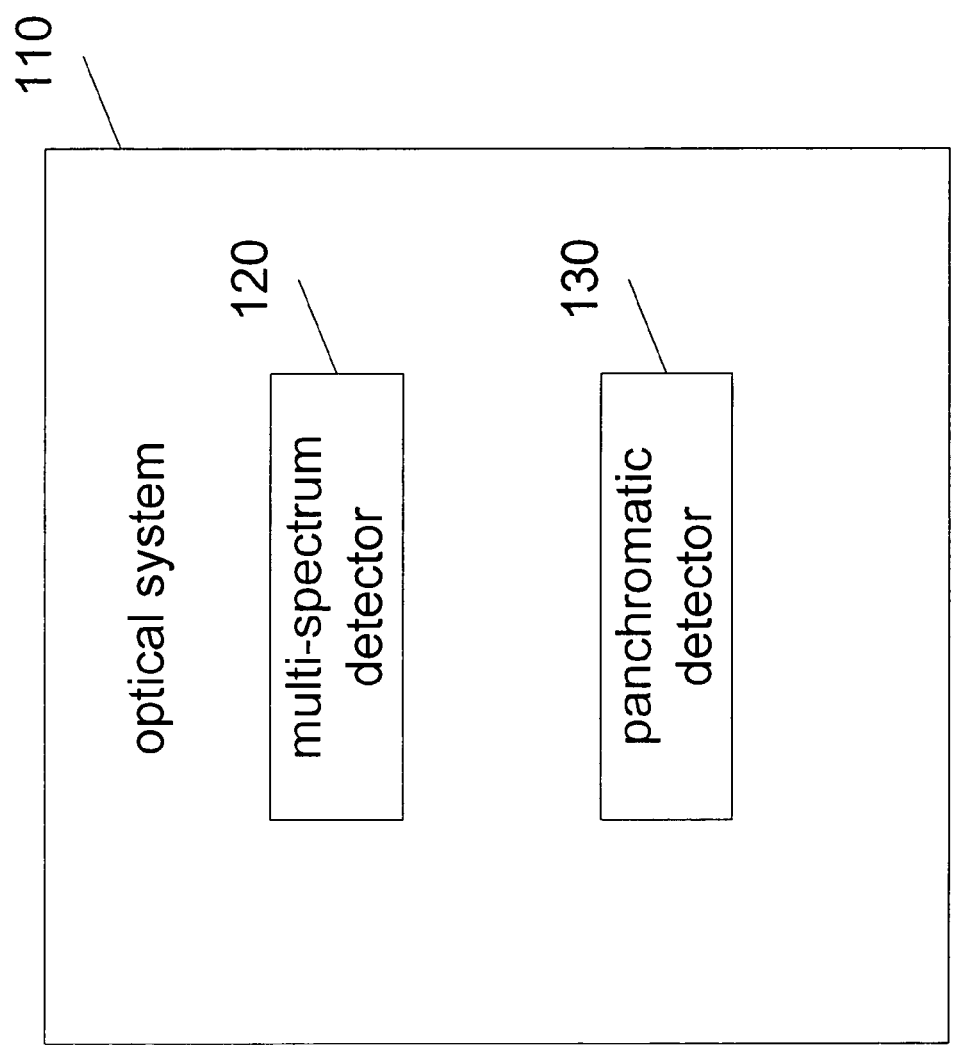
FIG. 1 is a simplified diagram for a conventional optical system with panchromatic detector and multi-spectral detector.
Figure 2:
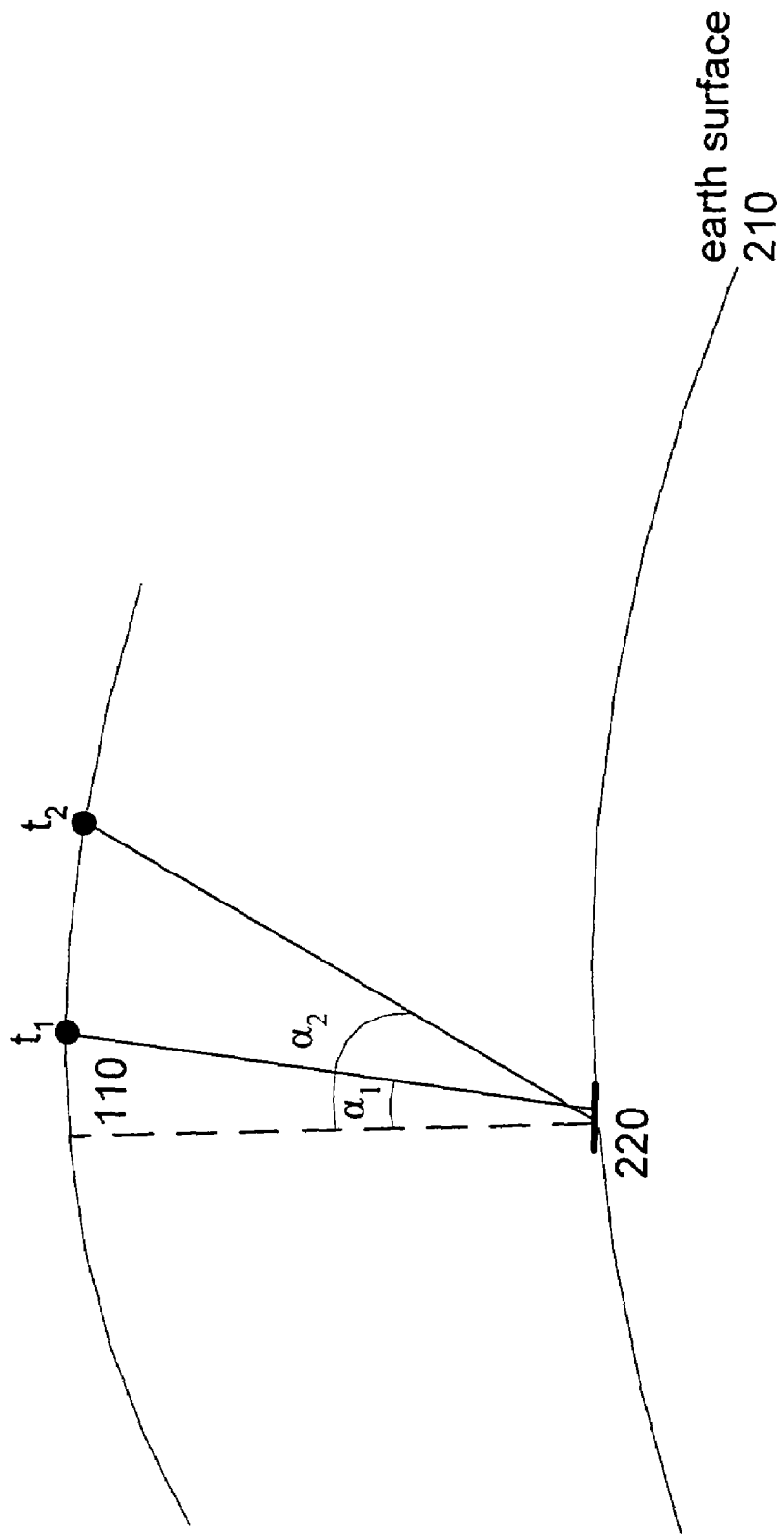
FIG. 2 illustrates a simplified conventional process for optical system to capture multiple images of an imaging target on the earth surface.

As shown in FIG. 2, multi-spectral detector 120 and panchromatic detector 130 usually capture images at different times. During the interval, imaging area may have changed. Additionally, imaging angle $\alpha_1$ at time $t_1$ and imaging angle $\alpha_2$ at time $t_2$ are usually different. Consequently, the spectral images captured by multi-spectral detector 120 are not aligned with the panchromatic image captured by panchromatic detector 130.

Figure 3:
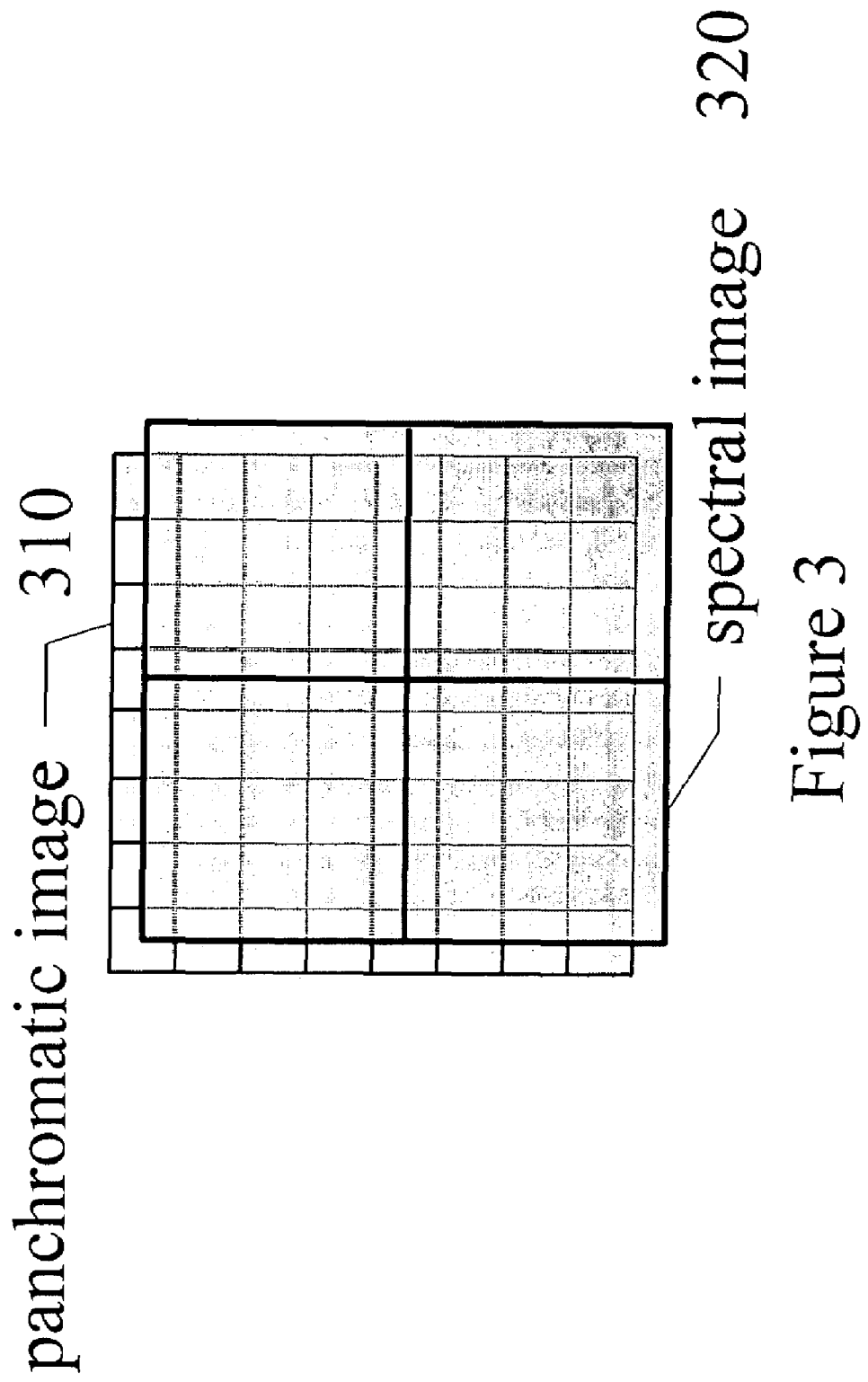
FIG. 3 illustrates a simplified misalignment between a panchromatic image and a spectral image according to one embodiment of the present invention.

FIG. 3 illustrates a simplified misalignment between a panchromatic image and a spectral image according to one embodiment of the present invention. This diagram is merely an example, which should not unduly limit the scope of the claims. One of ordinary skill in the art would recognize many variations, alternatives, and modifications. Panchromatic image 310 and spectral image 320 are captured for the same imaging target. Thus a certain area of the imaging target corresponds to a pixel on panchromatic image 310 and a larger area of the imaging target corresponds to a pixel on spectral image 320. The pixel has a position in panchromatic image 310 that is different from the pixel in spectral image 320. For example, the pixel on spectral image 320 represents an area of the imaging target that is further to the right than the area associated with the pixel on panchromatic image 310. In some applications, panchromatic image 310 usually has a higher resolution than spectral image 320. Several spectral images are pan-sharpened with a panchromatic image to create a high resolution multi-spectral image. The misregistration between panchromatic image 310 and spectral image 320 usually reduces the quality of pan-sharpened multi-spectral imagery. The pan-sharpened multi-spectral image becomes less radiometrically accurate and less visually crisp.

Figure 4:
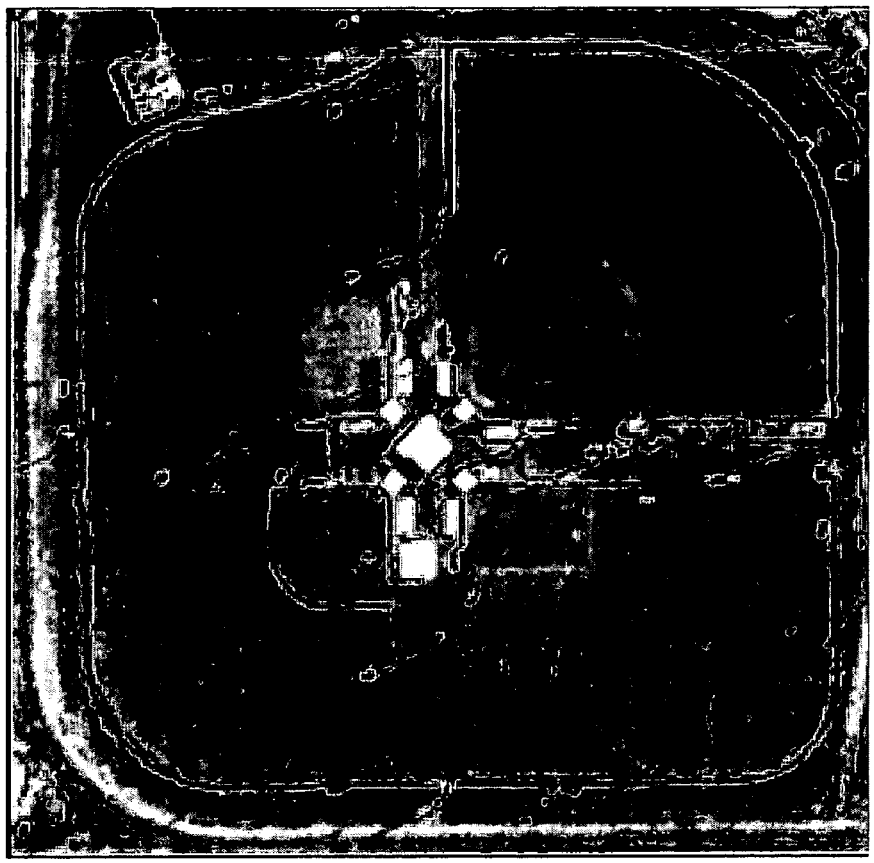
FIG. 4 shows certain geometrical degradations and distortions in pan-sharpened multi-spectral imagery.
Figure 5:
FIG. 5 shows certain smeared colors in pan-sharpened multi-spectral imagery.
Figure 6:
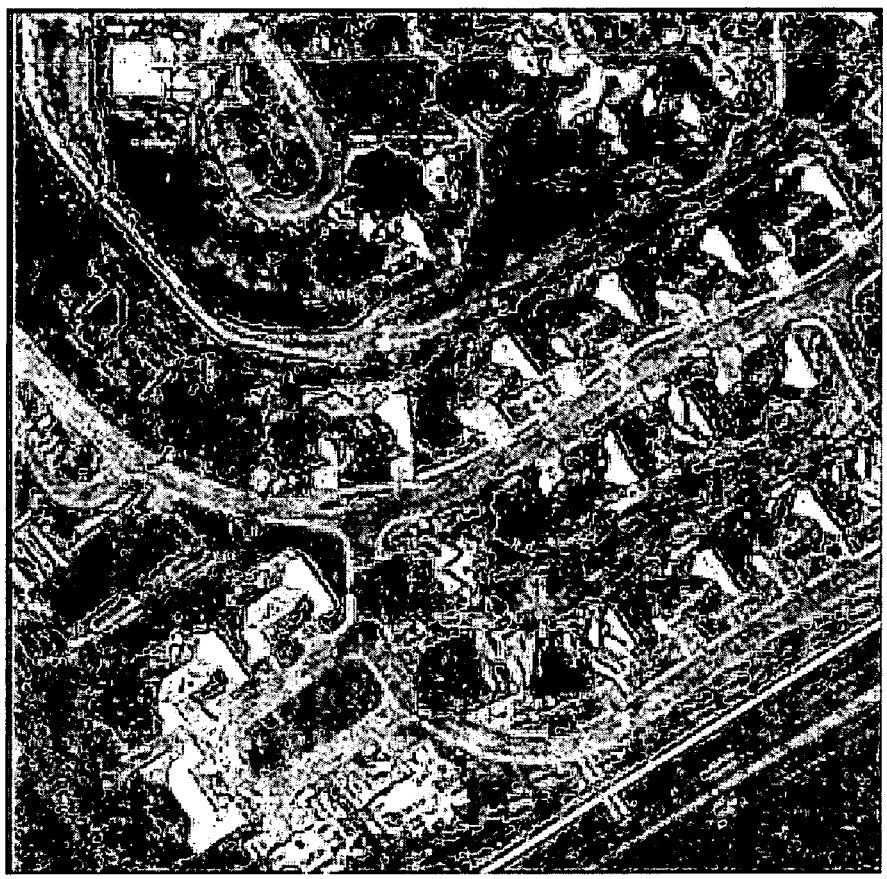
FIG. 6 shows certain saturated colors in pan-sharpened multi-spectral imagery.

FIGS. 4, 5, and 6 illustrate various types of image defects. These diagrams are merely examples, which should not unduly limit the scope of the claims. One of ordinary skill in the art would recognize many variations, alternatives, and modifications. FIG. 4 shows certain geometrical degradations and distortions in pan-sharpened multi-spectral imagery, FIG. 5 shows certain smeared colors in pan-sharpened multi-spectral imagery, and FIG. 6 shows certain saturated colors in pan-sharpened multi-spectral imagery.

Figure 7:
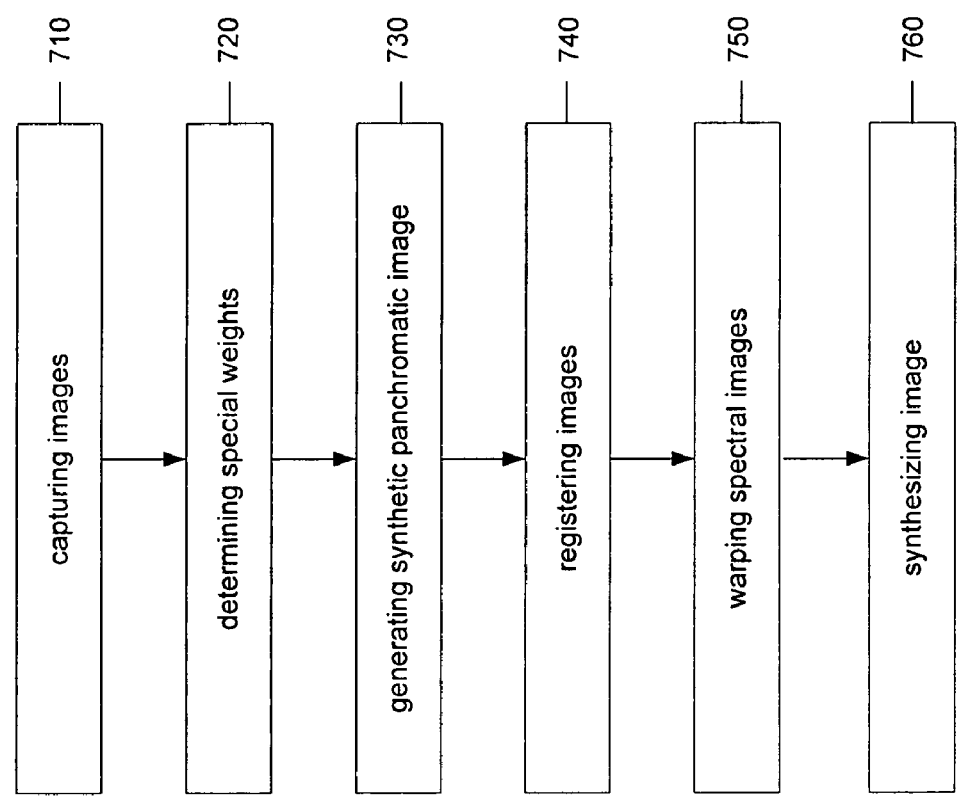
FIG. 7 is a simplified block diagram for a method using a synthetic panchromatic image to synthesize a multi-spectral image according to one embodiment of the present invention.

FIG. 7 is a simplified block diagram for a method using a synthetic panchromatic image to synthesize a multi-spectral image according to one embodiment of the present invention. This diagram is merely an example, which should not unduly limit the scope of the claims. One of ordinary skill in the art would recognize many variations, alternatives, and modifications. The method includes process 710 for capturing images, process 720 for determining spectral weights, process 730 for generating synthetic panchromatic image, process 740 for registering images, process 750 for warping spectral images, and process 760 for synthesizing an image. Although the above has been shown using a selected sequence of processes, there can be many alternatives, modifications, and variations. For example, some of the processes may be expanded and/or combined. Other processes may be inserted to those noted above. Depending upon the embodiment, the specific sequence of processes may be interchanged with other replacements. Further details of these processes are found throughout the present specification and more particularly below.

At process 710 for capturing images, a panchromatic image and at least two spectral images are captured for an imaging target. The panchromatic image usually covers a wide range of the spectrum, while each spectral image is usually in a specific band of wavelength, such as red band, green band, blue band, or NIR band. In certain embodiment of the present invention, at process 710, five images are captured for an imaging target, and these images are panchromatic, red, green, blue, and NIR. Additionally, in some embodiments of the present invention, the panchromatic image and the at least two spectral images are captured at different times. Additionally, in certain embodiments of the present invention, the captured spectral images have a resolution lower than that of the captured panchromatic image.

At process 720 for determining spectral weights, relative weights of the spectral images are estimated. The relative weights usually vary from 0% to 100%, and the sum of all relative weights usually does not exceed 100%. Each spectral image is multiplied by its corresponding relative weight and the sum of weighted spectral images should approximate intensities of a panchromatic image at various pixels.

According to one embodiment of the present invention, process 720 uses a linear spectral model. See U.S. Pat. No. 6,097,835. U.S. Pat. No. 6,097,835 is hereby incorporated by reference for all purposes. The linear spectral model assumes that the panchromatic image covers a spectrum that is nearly identical to the combined spectrum of various spectral images. For example, the panchromatic spectrum is nearly identical to the combined spectrum of red, green, blue, and NIR bands of wavelengths. Additionally, the liner spectral model assumes pixels that are in the same location in panchromatic image and spectral images correspond to the same part of the imaging target with only limited misregistration. Moreover, the linear spectral model also assumes a linear relationship between intensities of the panchromatic image and spectral images, as shown below.

$$p = b + \sum_{i=0}^{n-1} w_i m_i + \varepsilon \quad \text{(Equation 1)}$$

where p is the intensity for a pixel in panchromatic image, $w_i$ is the spectral weight for $i^{th}$ spectral image, $m_i$ is the intensity for a pixel in $i^{th}$ spectral image, n is the total number of spectral images for an imaging target, b is a constant additive bias in panchromatic intensity values, and $\varepsilon$ is an error term. Alternatively, Equation 1 can be rewritten into vector format, as shown below.

$$p = b + \vec{w}^T \vec{m} + \varepsilon \quad \text{(Equation 2)}$$

where $\vec{m}$ is a column vector of pixel intensities on various spectral images, and $\vec{w}$ is a column vector of spectral weights for various spectral images. More specifically, $$\vec{m} = \begin{bmatrix} m_0 \\ \vdots \\ m_{n-1} \end{bmatrix} \quad \text{(Equation 2A)}$$

$$\vec{w} = \begin{bmatrix} w_0 \\ \vdots \\ w_{n-1} \end{bmatrix} \quad \text{(Equation 2B)}$$

Both Equations 1 and 2 assume that intensity values of the panchromatic image and the spectral images have been processed to correspond to a common spatial resolution. For example, the captured panchromatic image may have a resolution sixteen times better than that of the captured spectral images. For each pixel in the spectral image, the intensities of sixteen pixels on the panchromatic image can be averaged. Alternatively, other methods can be used to match the spatial resolution of the spectral images and the panchromatic image.

According to certain embodiments of the present invention, relative sensitivities of spectral images in various bands of wavelength are known, so the weight vector $\vec{w}$ and panchromatic bias b can be calculated directly from radiometry measurements. In other embodiments, the model is unknown but linear, so the standard least square method can be used to determine $\vec{w}$ and b. For example, $\vec{w}$ and b can be determined using the "pseudo-inverse" method. See, e.g., W. Press, B. Fannery, S. Teukolsky, W. Vetterling, Numerical Recipes, Chapter 2, Cambridge University Press, 1988.

Process 720 may use pixel intensities only in a sample area of panchromatic image and spectral images or use pixel intensities in the entire panchromatic image and spectral images. The number of pixels used for estimating spectral weights can be represented by s. Accordingly, Equations 1 and 2 can be can be written in matrix form as shown below.

$$\begin{bmatrix} p_0 \\ \vdots \\ p_{s-1} \end{bmatrix} = \begin{bmatrix} m_{0,0} & \cdots & m_{0,n-1} & 1 \\ \vdots & & \vdots & \vdots \\ m_{s-1,0} & & m_{s-1,n-1} & 1 \end{bmatrix} \begin{bmatrix} w_0 \\ \vdots \\ w_{n-1} \\ b \end{bmatrix} + \begin{bmatrix} \varepsilon_0 \\ \vdots \\ \varepsilon_{s-1} \end{bmatrix} \quad \text{(Equation 3)}$$

where $\vec{p}$ is the intensity vector for panchromatic image, $\vec{M}$ is the intensity matrix for spectral images, $\vec{\varepsilon}$ is the error vector. In more detail, $$\vec{p} = \begin{bmatrix} p_0 \\ \vdots \\ p_{s-1} \end{bmatrix} \quad \text{(Equation 3A)}$$

$$\vec{M} = \begin{bmatrix} m_{0,0} & \cdots & m_{0,n-1} \\ \vdots & & \\ m_{s-1,0} & \cdots & m_{s-1,n-1} \end{bmatrix} \quad \text{(Equation 3B)}$$

$$\vec{\varepsilon} = \begin{bmatrix} \varepsilon_0 \\ \vdots \\ \varepsilon_{s-1} \end{bmatrix} \quad \text{(Equation 3C)}$$

The objective of the least square method is to minimize the magnitude of error term $\vec{\varepsilon}$. The magnitude of $\vec{\varepsilon}$ can be calculated as below.

$$J = \varepsilon^T \varepsilon = \sum_{i=0}^{s-1} \varepsilon_i^2 \quad \text{(Equation 4)}$$

where J is the magnitude of the error term. The minimum value for J is usually reached when $$\begin{bmatrix} \vec{w} \\ b \end{bmatrix} = (\vec{M}^T \vec{M})^{-1} \vec{M}^T \vec{p} \quad \text{(Equation 5)}$$

The least square method as discussed above usually works for well-behaved input data. Alternatively, other methods such as the singular value decomposition (SVD) algorithm can be utilized to estimate the weight vector $\vec{w}$ and panchromatic bias b. See, e.g., W. Press, B. Fannery, S. Teukolsky, W. Vetterling, Numerical Recipes, Chapter 2, Cambridge University Press, 1988.

At process 730 for generating synthetic panchromatic image, a synthetic panchromatic image is created based on spectral images. The process 730 usually does not use the captured panchromatic image. For example, the captured spectral images usually have a resolution lower than that of the captured panchromatic image, so the synthetic panchromatic image also has a resolution lower than that of the captured panchromatic image. The synthetic panchromatic image can be created with various methods. According to one embodiment of the present invention, the synthetic panchromatic image is generated as follows.

$$p = b + \sum_{i=0}^{n-1} w_i m_i \quad \text{(Equation 6)}$$

where p is the intensity for a pixel in the synthetic panchromatic image, $w_i$ is the spectral weight for $i^{th}$ captured spectral image, $m_i$ is the intensity for a pixel in $i^{th}$ captured spectral image, n is the total number of spectral images for an imaging target, b is a constant additive bias in panchromatic intensity values. The weight vector $\vec{w}$ and panchromatic bias b have been determined in process 720.

Figure 8:
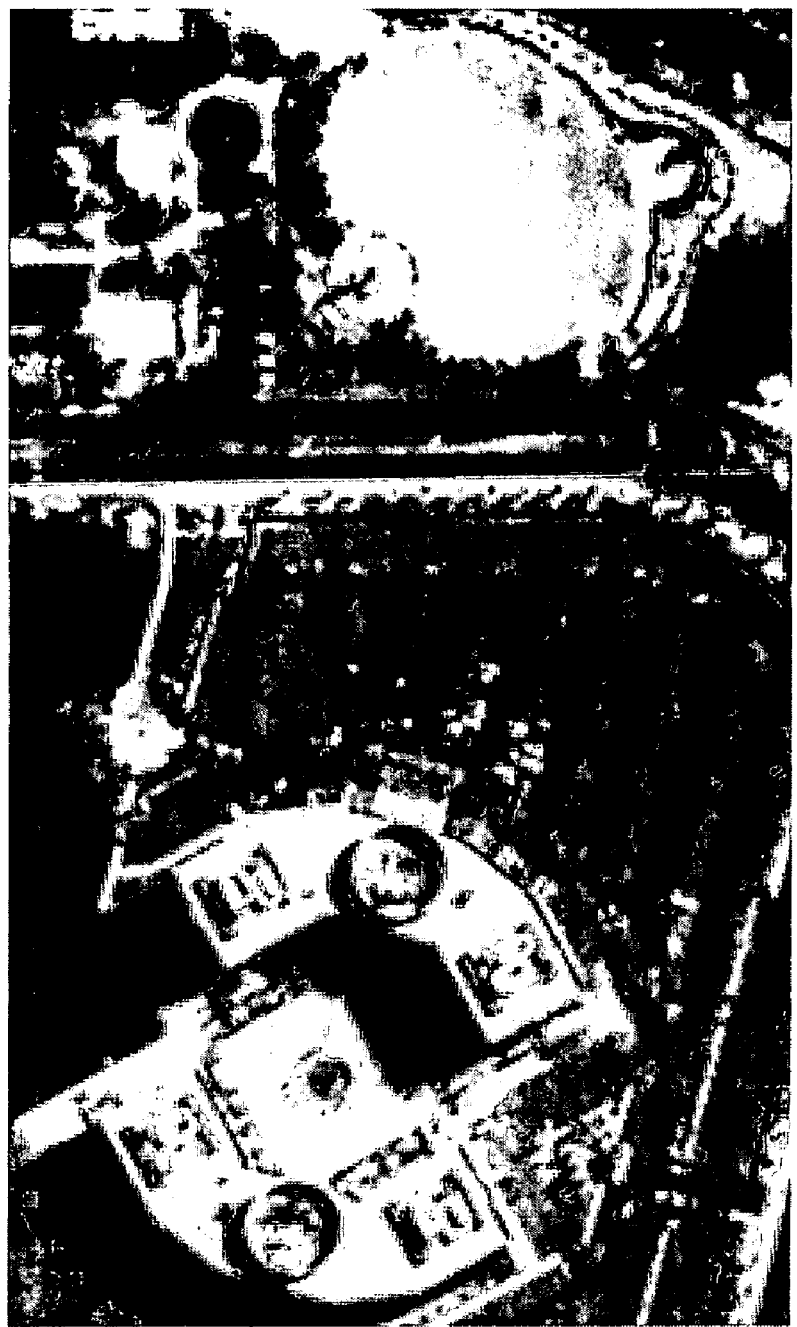
FIGS. 8 and 9 are simplified diagrams showing different resolutions for captured panchromatic image and synthetic panchromatic image.
Figure 9:

FIGS. 8 and 9 are simplified diagrams showing different resolutions for captured panchromatic image and synthetic panchromatic image. These diagrams are merely examples, which should not unduly limit the scope of the claims. One of ordinary skill in the art would recognize many variations, alternatives, and modifications. FIG. 810 shows captured panchromatic image 810, and in contrast FIG. 9 shows synthetic panchromatic image 910. The synthetic panchromatic image 910 is created with captured spectral images. The captured spectral images have a linear resolution only one quarter of the linear resolution of captured panchromatic image 810. Consequently, synthetic panchromatic image 910 also has a linear resolution only one quarter of that of captured panchromatic image 810.

At process 740 for registering images, the captured panchromatic image and the synthetic panchromatic image are aligned by computing registration offsets. The alignment can match pixels on the captured panchromatic image and the synthetic panchromatic image that correspond to the same imaging area. The registration offsets represent the size of relative movement between the captured and the synthetic panchromatic images.

Figure 10:
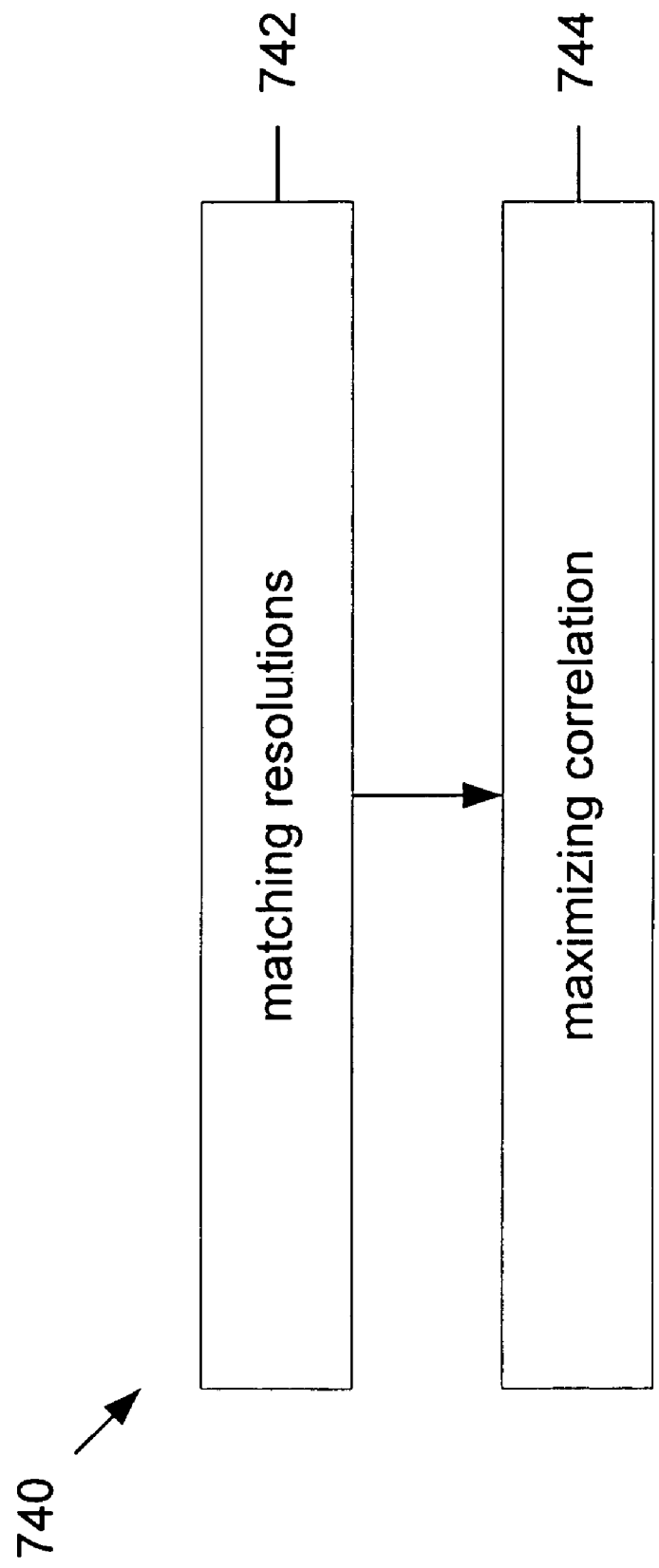
FIG. 10 is a simplified block diagram for registering images according to one embodiment of the present invention.

FIG. 10 is a simplified block diagram for registering images according to one embodiment of the present invention. This diagram is merely an example, which should not unduly limit the scope of the claims. One of ordinary skill in the art would recognize many variations, alternatives, and modifications. Process 740 for registering images includes process 742 for matching resolutions and process 744 for maximizing correlation. Although the above has been shown using a selected sequence of processes, there can be many alternatives, modifications, and variations. For example, some of the processes may be expanded and/or combined. Other processes may be inserted to those noted above. Depending upon the embodiment, the specific sequence of processes may be interchanged with other replaced. Process 742 may be skipped if the synthetic panchromatic image has substantially the same resolution as the captured panchromatic image. Further details of these processes are found throughout the present specification and more particularly below.

At process 742 for matching resolutions, pixel intensities of the panchromatic image and the spectral images are processed to correspond to a common spatial resolution. For example, as shown in FIGS. 8 and 9, the captured panchromatic image may have a linear resolution four times higher than that of the captured spectral images. Hence each pixel in the synthetic panchromatic image corresponds to sixteen pixels in the captured panchromatic image. The intensities of sixteen pixels on the captured panchromatic image should be averaged. Alternatively, the intensities of four pixels on the captured panchromatic image are averaged, and the intensity of each pixel in the synthetic panchromatic image is repeated four times. In other words, each synthetic pixel is divided into four pixels. Other methods such as oversampling the spectral images by a factor of two and downsampling the panchromatic image by a factor of 2 can also be used to match the spatial resolutions of the synthetic panchromatic resolution and the captured panchromatic image.

At process 744 for maximizing correlation, pixels of the captured panchromatic image are matched with pixels of the synthetic panchromatic image so that corresponding pixels in the captured panchromatic image and the synthetic panchromatic image describe the same part of the imaging target. Matching all pixels in the captured panchromatic image with all pixels in the synthetic panchromatic image may be difficult, but process 744 maximizes the correlation between the captured and synthetic panchromatic images.

Figure 11:
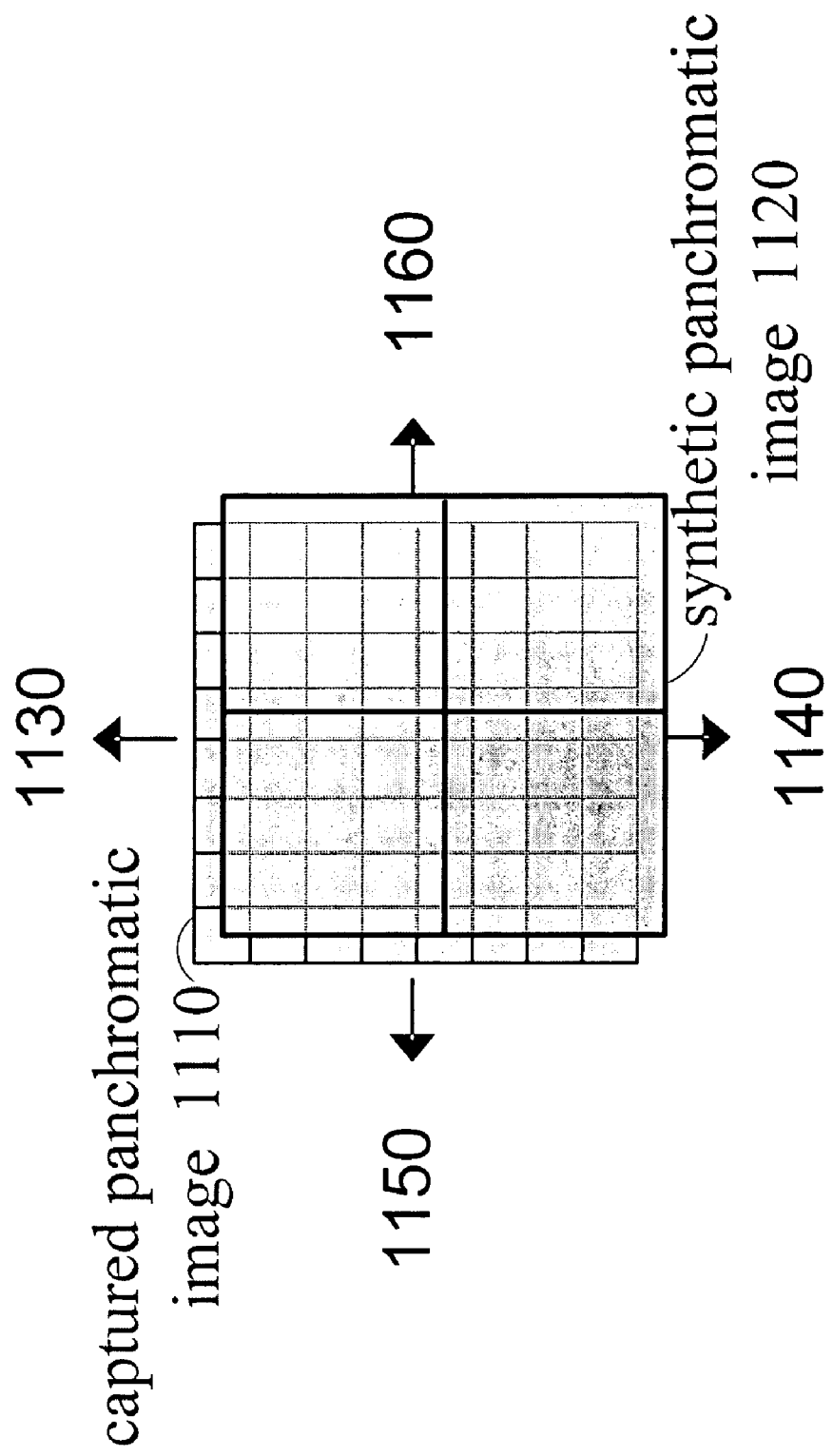
FIG. 11 shows a simplified diagram for maximizing correlation according to one embodiment of the present invention.

FIG. 11 shows a simplified diagram for maximizing correlation according to one embodiment of the present invention. This diagram is merely an example, which should not unduly limit the scope of the claims. One of ordinary skill in the art would recognize many variations, alternatives, and modifications. Captured panchromatic image 1110 and synthetic panchromatic image 1120 have been processed so that they have the same spatial resolution. At process 744, captured and synthetic panchromatic images 1110 and 1120 moves with respect to each other in one or several of directions 1130, 1140, 1150 and 1160. The overlapping pixels in captured and synthetic panchromatic images 1110 and 1120 should correspond to substantially the same imaging area. At least, process 740 tries to match as many pixels as possible. As discussed above, FIG. 11 is merely an illustration. The movement between captured panchromatic image 1110 and synthetic panchromatic image 1120 may involve a movement in any direction, a rotation around any axis, or other form of movement.

According to one embodiment of the present invention, process 744 maximizes a normalized cross correlation as follows.

$$\rho = \frac{(v - \overline{v})^T (w - \overline{w})}{|(v - \overline{v})||w - \overline{w}|} \qquad \text{(Equation 7)}$$

where $$v = \begin{bmatrix} v_1 \\ \vdots \\ v_Q \end{bmatrix} \qquad \text{(Equation 8)}$$

$$\overline{v} = \frac{\sum_{i=1}^{Q} v_i}{Q} \qquad \text{(Equation 9)}$$

$$w = \begin{bmatrix} w_1 \\ \vdots \\ w_Q \end{bmatrix} \qquad \text{(Equation 10)}$$

$$\overline{w} = \frac{\sum_{i=1}^{Q} w_i}{Q} \qquad \text{(Equation 11)}$$

Q is the total number of pixels in the synthetic panchromatic image and the total number of pixels in the captured panchromatic image. $v_1, \ldots, v_Q$ are intensities for pixel 1, ..., pixel Q respectively in the synthetic panchromatic image. $w_1, \ldots, w_Q$ are intensities for pixel 1, ..., pixel Q respectively in the captured panchromatic image. ρ varies from minus 1 to positive one, and positive one usually represents perfect correlation between the synthetic and captured panchromatic images. Process 744 maximizes ρ and thereby improves the correlation between the synthetic and captured panchromatic images.

Figure 12:
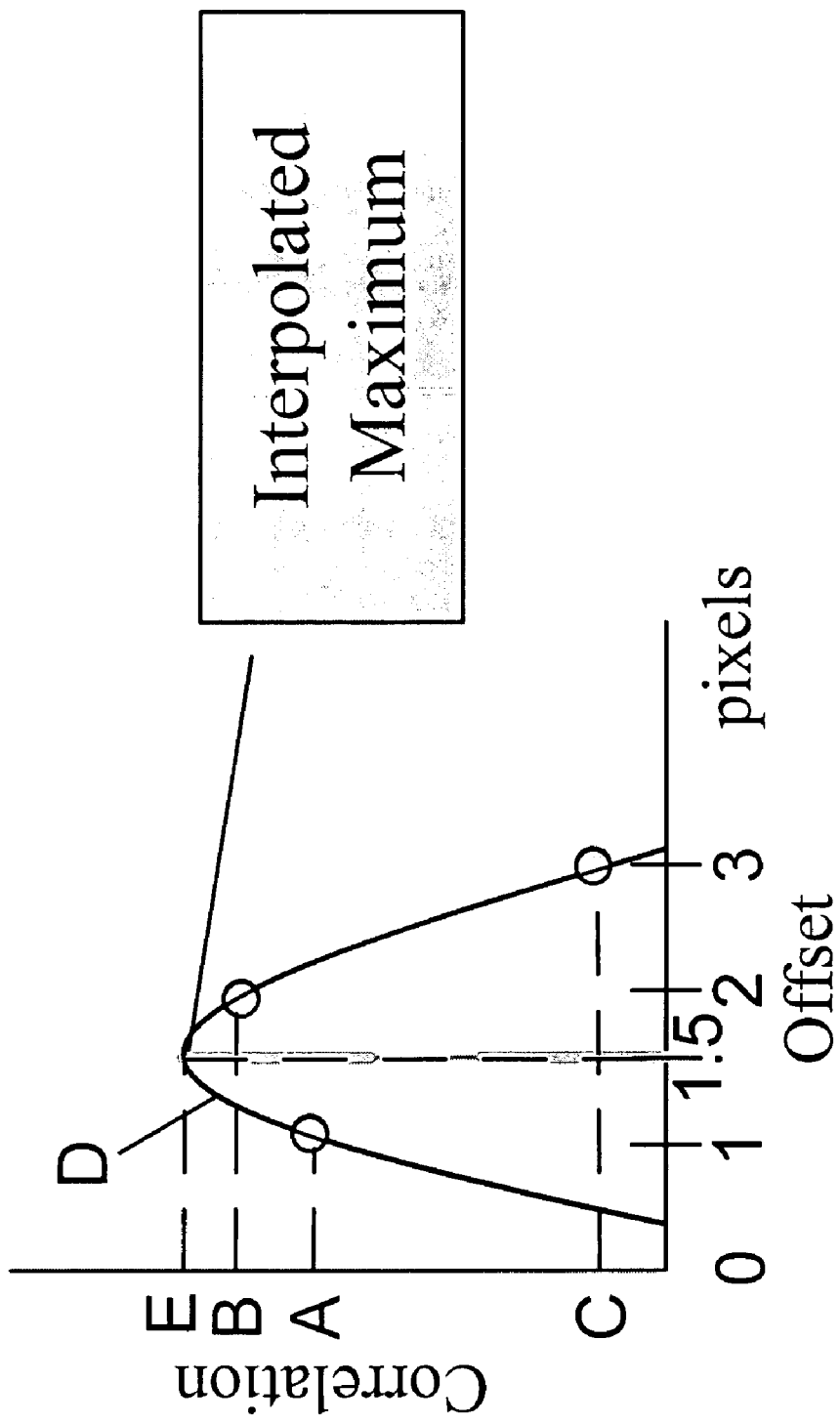
FIG. 12 shows a simplified diagram for maximizing correlation according to another embodiment of the present invention.

FIG. 12 shows a simplified diagram for maximizing correlation according to another embodiment of the present invention. This diagram is merely an example, which should not unduly limit the scope of the claims. One of ordinary skill in the art would recognize many variations, alternatives, and modifications. As discussed above, captured and synthetic panchromatic images can be moved with respect to each other in order to maximize their correlation. This correlation usually involves translation of images by at least one pixel, but the maximum correlation sometimes requires image translation of a fraction of a pixel. Such sub-pixel translation can be accomplished by fitting a polynomial to the correlation as a function of registration offset, where the registration offset is the number of pixels by which the two images are translated with respect to each other.

For example, as shown in FIG. 12, correlation values between captured and synthetic panchromatic images are measured with registration offset equal to one, two, and three pixels. At offset equal to one pixel, correlation has value A. At offset equal to two pixels, correlation has value B. At offset equal to three pixels, correlation has value C. Using these data points, the relationship between correlation and offset can be fitted with a quadratic function. As shown in FIG. 12, the quadratic function is represented by Curve D. Curve D provides maximum correlation value E at registration offset equal to about 1.5 pixels. Maximum correlation value D is larger than any of measured values A, B, and C. Hence by function fitting or curve fitting, the maximum correlation can be achieved with limited number of correlation measurements. As discussed above and further emphasized here, FIG. 12 is merely an example. The number of measured correlations is not limited to three, and it may take any value. Depending on the number of measured correlations, the fitting function is not limited to quadratic function, and it may take any form.

At process 750 for warping spectral images, the spectral images are warped so that they align with the captured panchromatic image. This warping utilizes registration offsets (tie points) generated in process 740. A number of warping methods can be used, including but not limited to the polynomial warp.

At process 760 for synthesizing an image, a multi-spectral image is synthesized through a pan-sharpening process that uses the captured spectral images and captured panchromatic image. A multi-spectral image usually refers an image containing information from at least two bands of wavelengths. For example, a multi-spectral image could be a color image containing information from red band, green band, blue band, and NIR band. In certain embodiments of the present invention, the captured panchromatic image has a higher spatial resolution than the captured spectral images. Hence the captured panchromatic image can be used to sharpen the captured spectral images.

One alternative for panchromatic sharpening is to simply resample spectral images to panchromatic resolution using standard processes such as nearest neighbor, bilinear, or bicubic interpolation. See W. K. Pratt, Digital Image Processing, Second Edition, Chapter 14.5, John Wiley and Sons, New York, 1991. This method usually cannot produce a crisp multi-spectral image. Indeed the degree of blurriness of the synthesized image usually depends on the interpolation scheme used and the scene content.

Alternatively, panchromatic sharpening can improve on the above method. See U.S. Pat. No. 6,097,835. U.S. Pat. No. 6,097,835 is hereby incorporated by reference for all purposes. The re-sampled spectral images may be adjusted to the closest "model" intensity contained in the hyperplane determined by p−b and $\vec{w}$. Each panchromatic intensity, p, determines a different but parallel hyperplane. Based on the re-sampled intensity vector $\vec{m}$ for spectral images, weight vector $\vec{w}$, and unbiased panchromatic value p−b, $\vec{m}'$ can be projected to a point, m, on the plane defined in Equation 1 along the direction of $\vec{w}$.

Solving the equations for this projection is straightforward. The closest point on a hyperplane to a given exterior point can be found by starting at the exterior point and projecting to the hyperplane in the direction normal to the hyperplane. $\vec{w}$ is a vector normal to the hyperplane in Equation 1. If t denotes a scalar for projecting from $\vec{m}'$ in the direction of $\vec{w}$, the vector point $\vec{m}'+t\vec{w}$ intersects the hyperplane in Equation 1 precisely when $$p-b = \vec{w}^T(\vec{m}'+t\vec{w}) \qquad \text{(Equation 12)}$$

$$\text{Then } t = \frac{p - b - \vec{w}^T \vec{m}'}{\vec{m}^T \vec{w}} \qquad \text{(Equation 13)}$$

Consequently, the equation for an output pixel intensity of spectral images is given by $$m_i = \text{CLAMP}(m_i + tw_i)$$

where the CLAMP operator prevents pixel under or over flow on each output band. For a scalar, x, the CLAMP operator can be defined as follows:

$$\text{CLAMP}(x) = \text{Max}(\text{MinIntensity}, \text{Min}(x, \text{MaxIntensity})) \qquad \text{(Equation 13)}$$

where MinIntensity and MaxIntensity represent respectively the minimum and maximum intensities desired in the resulting image.

Figure 13A:
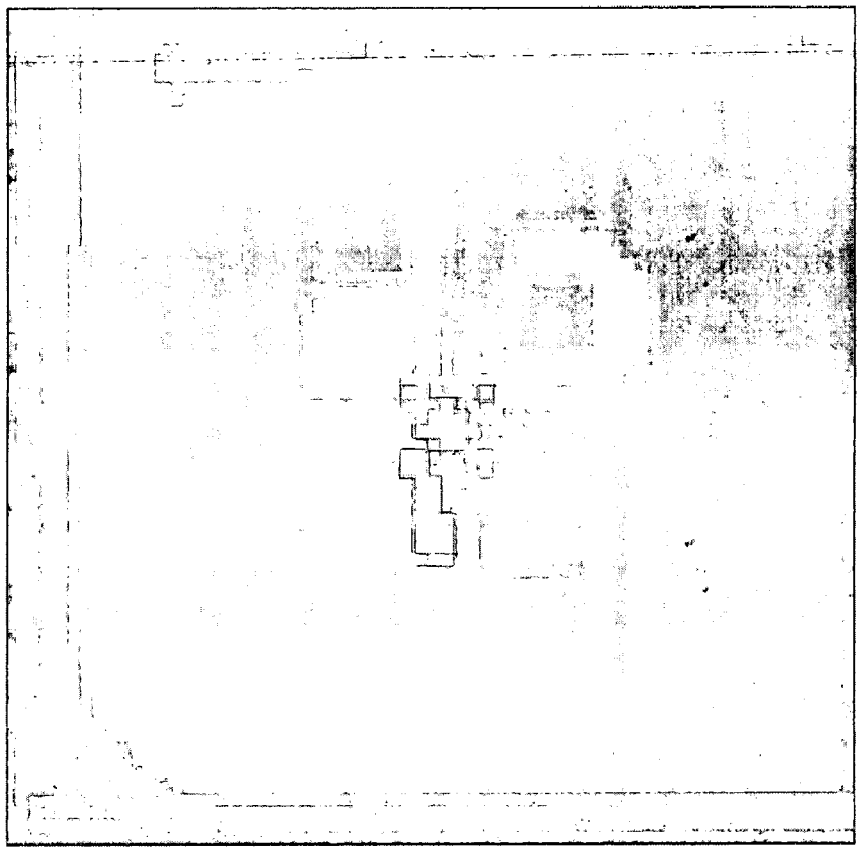
FIGS. 13(A), (B), and (C) are simplified diagrams showing superior image quality according to one embodiment of the present invention.
Figure 13B:
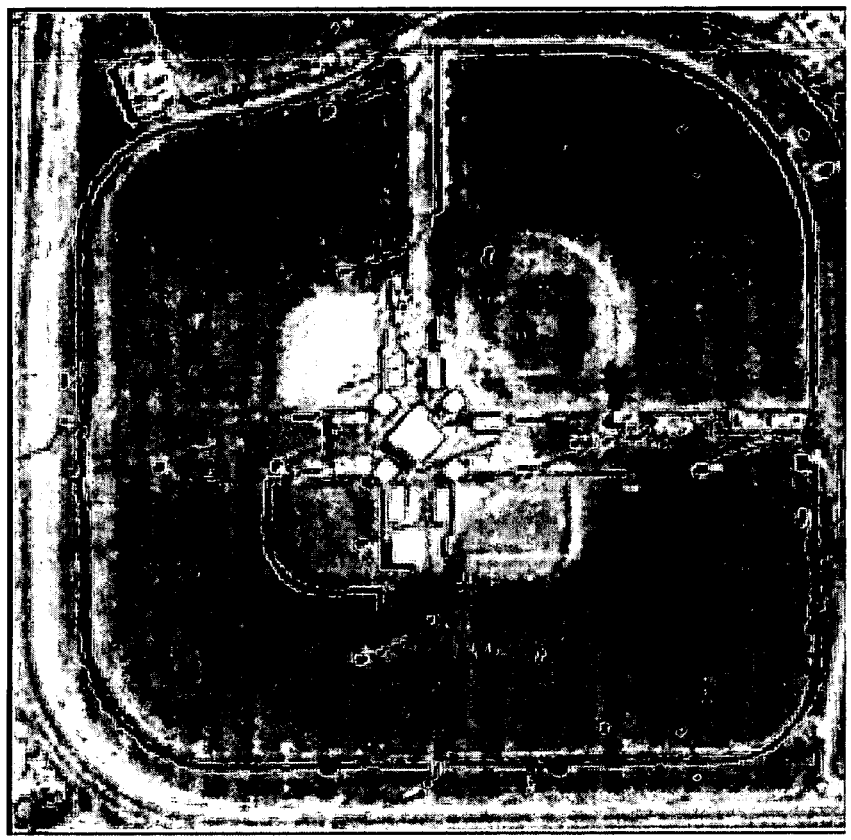
Figure 13C:
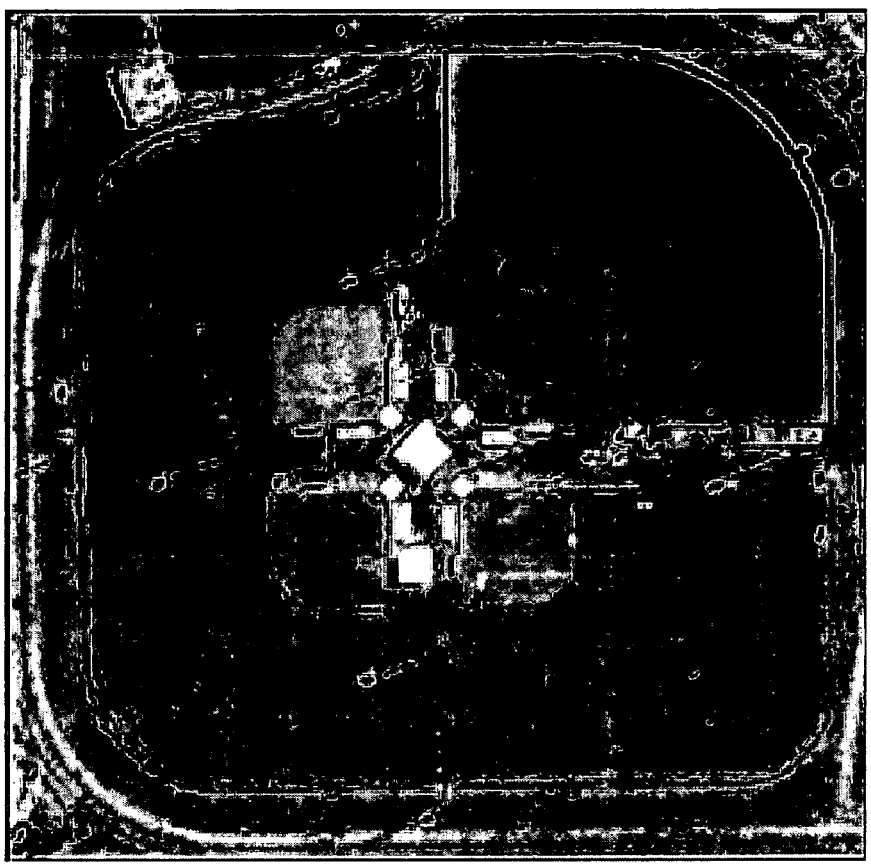

FIGS. 13(A), (B), and (C) are simplified diagrams showing superior image quality according to one embodiment of the present invention. These diagrams are merely examples, which should not unduly limit the scope of the claims. FIG. 13(A) shows a multi-spectral image without any panchromatic sharpening. The multi-spectral image usually has a lower resolution, hence when displayed as a color image produces only a blurry image. FIG. 13(B) shows a pan-sharpened multi-spectral image based on captured spectral images and a captured panchromatic image. The captured spectral images and the captured panchromatic image are unregistered. Hence the pan-sharpened multi-spectral image contains distortions even though the image shows some improvements over the image in FIG. 13(A). FIG. 13(C) shows a pan-sharpened multi-spectral image according to one embodiment of the present invention. The panchromatic sharpening process utilizes a synthetic panchromatic image in order to improve the registration between the captured spectral images and captured panchromatic image. As shown in FIG. 13(C), the image provides a view of the scene with few distortions.

Figure 14A:
FIGS. 14(A), (B), and (C) are simplified diagrams showing superior image quality according to another embodiment of the present invention.
Figure 14B:
Figure 14C:

FIGS. 14(A), (B), and (C) are simplified diagrams showing superior image quality according to another embodiment of the present invention. These diagrams are merely examples, which should not unduly limit the scope of the claims. FIG. 14(A) shows a multi-spectral image without any panchromatic sharpening. The multi-spectral image usually has a lower resolution, hence when displayed as a color image produces only a blurry image. FIG. 14(B) shows a pan-sharpened multi-spectral image based on captured spectral images and a captured panchromatic image. The captured spectral images and the captured panchromatic image are unregistered. Hence the pan-sharpened multi-spectral image contains distortions even though the image shows some improvements over the image in FIG. 14(A). FIG. 14(C) shows a pan-sharpened multi-spectral image according to another embodiment of the present invention. The panchromatic sharpening process utilizes a synthetic panchromatic image in order to improve the registration between captured spectral images and captured panchromatic image. As shown in FIG. 14(C), the image provides a view of the scene with few smeared colors.

Figure 15A:
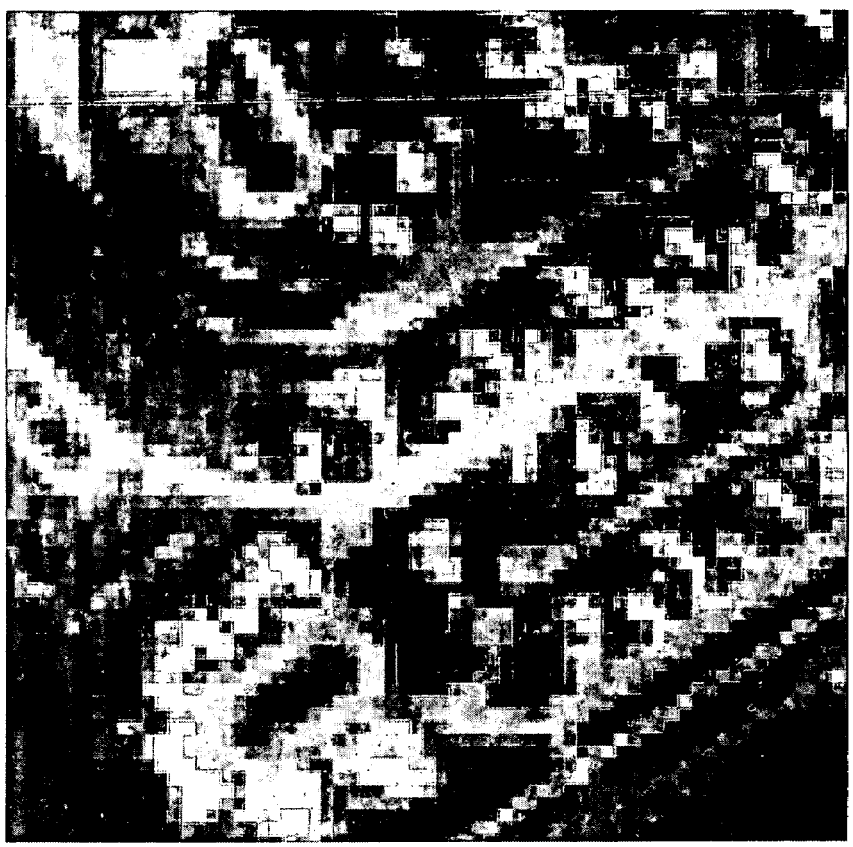
FIGS. 15(A), (B), and (C) are simplified diagrams showing superior image quality according to yet another embodiment of the present invention.
Figure 15B:
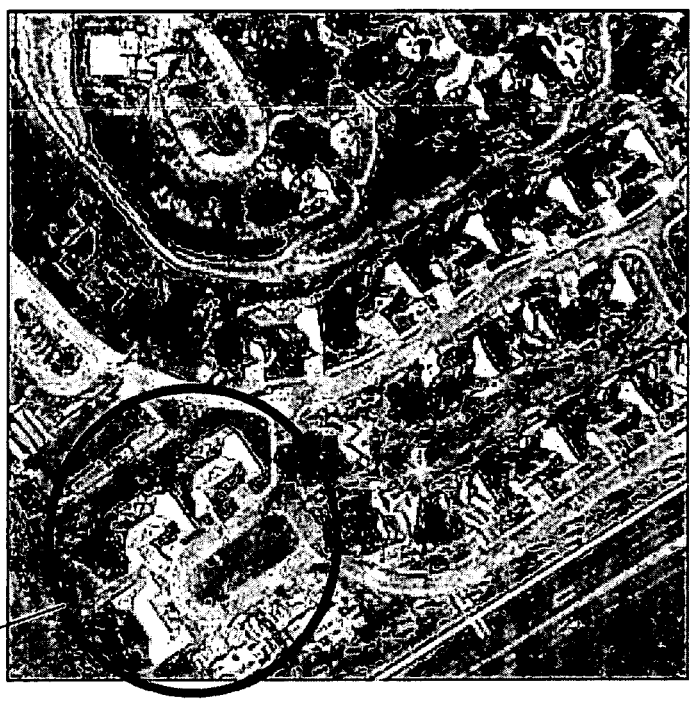

FIGS. 15(A), (B), and (C) are simplified diagrams showing superior image quality according to yet another embodiment of the present invention. These diagrams are merely examples, which should not unduly limit the scope of the claims. FIG. 15(A) shows a multi-spectral image without any panchromatic sharpening. The multi-spectral image usually has a lower resolution, hence when displayed as a color image produces only a blurry image. FIG. 15(B) shows a pan-sharpened multi-spectral image based on captured spectral images and a captured panchromatic image. The captured spectral images and the captured panchromatic image are unregistered. Hence the pan-sharpened multi-spectral image contains distortions even though the image shows some improvements over the image in FIG. 15(A). FIG. 15(C) shows a pan-sharpened multi-spectral image according to yet another embodiment of the present invention. The panchromatic sharpening process utilizes a synthetic panchromatic image in order to improve the registration between captured spectral images and captured panchromatic image. As shown in FIG. 15(C), the image provides a view of the scene with few saturated colors.

The present invention has various advantages. Certain embodiments of the present invention improve the quality of panchromatic sharpening processes and subsequently derived high quality multi-spectral image products. In some embodiments of the present invention, the synthetic panchromatic image can provide high correlation with the captured panchromatic image. This high correlation leads to accurate panchromatic to multi-spectral registration offset generation and thus improves effectiveness of subsequent panchromatic sharpening. Certain embodiments of the present invention allow panchromatic sensor and/or spectral imaging sensors to be designed with less strict requirements in order to maintain the same image registration accuracy. Use of synthetic panchromatic image allows effective post-processing to remove image misregistration artifacts caused by sensors. Some embodiments of the present invention can be implemented very efficiently using existing hardware and software technology.

It is understood the examples and embodiments described herein are for illustrative purposes only. Certain embodiments of the present invention may be implemented by a computer program. Various modifications or changes in light thereof will be suggested to persons skilled in the art and are to be included within the spirit and purview of this application and scope of the appended claims.

What is claimed is:

1. A method for making a multi-spectral image, the method comprising:
    capturing a panchromatic image of an imaging target, the captured panchromatic image being associated with a captured panchromatic resolution;
    capturing at least a first spectral image of the imaging target in a first spectral bandwidth, the first spectral image being associated with a first spectral resolution;
    capturing at least a second spectral image of the imaging target in a second spectral bandwidth, the second spectral image being associated with a second spectral resolution;
    determining at least a first spectral weight and a second spectral weight for the first spectral image and the second spectral image respectively based on at least information associated with the captured panchromatic image, the first spectral image and the second spectral image;
    generating a synthetic panchromatic image based on at least information associated with the first spectral image, the second spectral image, the first spectral weight, and the second spectral weight, the synthetic panchromatic image being associated with a synthetic panchromatic resolution;
    determining a registration offset between the synthetic panchromatic image and the captured panchromatic image by matching a first pixel on the synthetic panchromatic image and a second pixel on the captured panchromatic image, the first pixel and the second pixel corresponding to a same portion of the imaging target;
    warping the first spectral image and the second spectral image based on at least information associated with the registration offset;
    generating a multi-spectral image based on at least information associated with the first spectral image, the second spectral image, the first spectral weight, the second spectral weight, the captured panchromatic image, and the registration offset, the generated multi-spectral image being associated with a third resolution.

2. The method of claim 1 wherein the generating a synthetic panchromatic image is free from using information associated with the captured panchromatic image.

3. The method of claim 1 wherein the third resolution is higher than the first spectral resolution and the second spectral resolution.

4. The method of claim 1 wherein the captured panchromatic resolution is higher than the first spectral resolution and the second spectral resolution.

5. The method of claim 4 wherein the captured panchromatic resolution is higher than the synthetic panchromatic resolution.

6. The method of claim 5 wherein the synthetic panchromatic resolution is equal to the first spectral resolution and the second spectral resolution.

7. The method of claim 1 wherein the first spectral weight ranges from 0% to 100%.

8. The method of claim 7 wherein a sum of the first spectral weight and the second spectral weight is smaller than or equal to 100%.

9. The method of claim 8 wherein the determining at least a first spectral weight and a second spectral weight uses at least a linear spectral model.

10. The method of claim 9 wherein the determining at least a first spectral weight and a second spectral weight uses at least intensities of pixels located in a first portion of the captured panchromatic image, a second portion of the first spectral image, and a third portion of the second spectral image.

11. The method of claim 1 wherein the determining a registration offset comprises maximizing a correlation between the synthetic panchromatic image and the captured panchromatic image.

12. The method of claim 11 wherein the determining a registration offset further comprises:
 processing at least information associated with the synthetic panchromatic image and the captured panchromatic image;
 modifying at least one of the synthetic panchromatic resolution and the captured panchromatic resolution based on at least information associated with the synthetic panchromatic image and the captured panchromatic image;
 wherein in response to the modifying at least one of the synthetic panchromatic resolution and the captured panchromatic resolution, the synthetic panchromatic resolution equals the captured panchromatic resolution.

13. The method of claim 12 wherein the maximizing a correlation between the synthetic panchromatic image and the captured panchromatic image comprises:
 translating the synthetic panchromatic image and the captured panchromatic image with respect to each other by a first offset value;
 determining a first correlation value corresponding to the first offset value;
 translating the synthetic panchromatic image and the captured panchromatic image with respect to each other by a second offset value;
 determining a second correlation value corresponding to the second offset value;
 processing at least information associated with the first correlation value, the first offset value, the second correlation value, and the second offset value;
 fitting the correlation as a function of the registration offset based on at least information associated with the first correlation value, the first offset value, the second correlation value, and the second offset value;
 determining a maximum correlation and the registration offset corresponding to the maximum correlation.

14. The method of claim 1 wherein the generating a multi-spectral image comprises:
 re-sampling at least the first spectral image and the second spectral image based on information associated with the captured panchromatic resolution;
 synthesizing the multi-spectral image based on at least information associated with the re-sampled first spectral image, the re-sampled second spectral image, and the captured panchromatic image.

15. A method for making a multi-spectral image, the method comprising:
 capturing a panchromatic image of an imaging target, the captured panchromatic image being associated with a captured panchromatic spatial resolution;
 capturing at least a first spectral image of the imaging target in a first spectral bandwidth, the first spectral image being associated with a first spectral spatial resolution, the first spectral spatial resolution being lower than the captured panchromatic spatial resolution;
 capturing at least a second spectral image of the imaging target in a second spectral bandwidth, the second spectral image being associated with a second spectral spatial resolution, the second spectral spatial resolution being lower than the captured panchromatic spatial resolution;
 generating a synthetic panchromatic image based on at least information associated with the first spectral image and the second spectral image, the synthetic panchromatic image being associated with a synthetic panchromatic spatial resolution;
 processing at least information associated with the synthetic panchromatic image and the captured panchromatic image;
 determining a registration offset between the synthetic panchromatic image and the captured panchromatic image by matching a first pixel on the synthetic panchromatic image and a second pixel on the captured panchromatic image, the first pixel and the second pixel corresponding to a same portion of the imaging target;
 warping the first spectral image and the second spectral image based on at least information associated with the registration offset;
 generating a multi-spectral image based on at least information associate with the first spectral image, the second spectral image, the first spectral weight, the second spectral weight, the captured panchromatic image, and the registration offset, the multi-spectral image being associated with a third spatial resolution, the third spatial resolution being substantially equal to the captured panchromatic spatial resolution.

16. The method of claim 15 wherein the third spatial resolution is higher than the synthetic panchromatic spatial resolution.

17. The method of claim 15 wherein the multi-spectral image is free from image distortion, smeared color, and saturated color.

18. The method of claim 15 wherein the generating a synthetic panchromatic image is free from using information associated with the captured panchromatic image.

19. The method of claim 15 wherein the first spectral spatial resolution equals the second spectral spatial resolution.

20. The method of claim 19 wherein the synthetic panchromatic spatial resolution equals the first spectral spatial resolution.

21. The method of claim 15 wherein the determining a registration offset comprises maximizing a correlation between the synthetic panchromatic image and the captured panchromatic image.

22. The method of claim 21 wherein the determining a registration offset further comprises:
 processing at least information associated with the synthetic panchromatic image and the captured panchromatic image;
 modifying at least one of the synthetic panchromatic spatial resolution and the captured panchromatic spatial resolution based on at least information associated with the synthetic panchromatic image and the captured panchromatic image;
 wherein in response to the modifying at least one of the synthetic panchromatic spatial resolution and the captured panchromatic spatial resolution, the synthetic panchromatic spatial resolution equals the captured panchromatic spatial resolution.

23. The method of claim 21 wherein the maximizing a correlation between the synthetic panchromatic image and the captured panchromatic image comprises:
 translating the synthetic panchromatic image and the captured panchromatic image with respect to each other by a first offset value;
 determining a first correlation value corresponding to the first offset value;
 translating the synthetic panchromatic image and the captured panchromatic with respect to each other by a second offset value;
 determining a second correlation value corresponding to the second offset value;

processing at least information associated with the first correlation value, the first offset value, the second correlation value, and the second offset value;

fitting the correlation as a function of the registration offset based on at least information associated with the first correlation value, the first offset value, the second correlation value, and the second offset value;

determining a maximum correlation and the registration offset corresponding to the maximum correlation.

24. The method of claim 15 wherein the generating a multi-spectral image comprises:

re-sampling the first spectral image and the second spectral image based on at least information associated with the captured panchromatic spatial resolution;

synthesizing the multi-spectral image based on at least information associated with the re-sampled the re-sampled, and the captured panchromatic image.

25. A method for making a color image, the method comprising:

capturing a panchromatic image of an imaging target, the captured panchromatic image being associated with a captured panchromatic resolution;

capturing at least a first spectral image of the imaging target in a first spectral bandwidth, the first spectral image being associated with a first spectral resolution;

capturing at least a second spectral image of the imaging target in a second spectral bandwidth, the second spectral image being associated with a second spectral resolution;

determining at least a first spectral weight and a second spectral weight for the first spectral image and the second spectral image respectively based on at least information associated with the captured panchromatic image, the first spectral image and the second spectral image;

generating a synthetic panchromatic image based on at least information associated with the first spectral image, the second spectral image, the first spectral weight, and the second spectral weight, the synthetic panchromatic image being associated with a synthetic panchromatic resolution;

determining a registration offset between the synthetic panchromatic image and the captured panchromatic image by matching a first pixel on the synthetic panchromatic image and a second pixel on the captured panchromatic image, the first pixel and the second pixel corresponding to a same portion of the imaging target;

warping the first spectral image and the second spectral image based on at least information associated with the registration offset;

generating a color image based on at least information associated with the first spectral image, the second spectral image, the first spectral weight, the second spectral weight, the captured panchromatic image, and the registration offset, the generated multi-spectral image being associated with a third resolution;

wherein the color image is free from image distortion, smeared color, and saturated color.

* * * * *